UNITED STATES PATENT OFFICE.

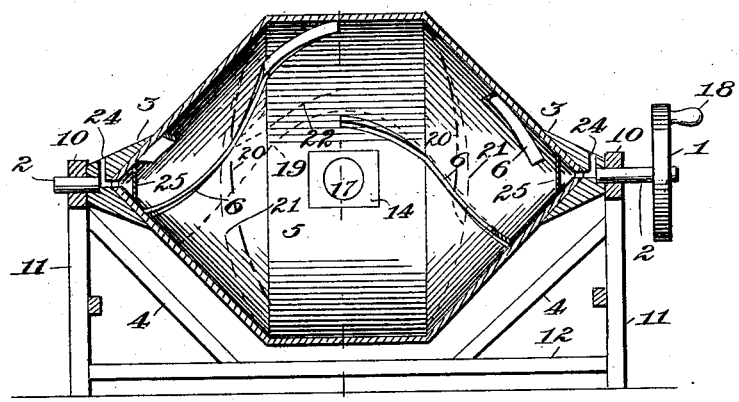

LA FAYETTE LILLARD, OF BOOTJACK, CALIFORNIA.

PNEUMATIC BUTTER-SEPARATOR.

No. 903,298.　　　　Specification of Letters Patent.　　Patented Nov. 10, 1908.

Application filed June 20, 1907. Serial No. 379,901.

*To all whom it may concern:*

Be it known that I, LA FAYETTE LILLARD, a citizen of the United States, residing at Bootjack, in the county of Mariposa and State of California, have invented a new and useful Pneumatic Butter-Separator, of which the following is a specification.

My invention relates to improvements in pneumatic butter separators in which narrow spiral wings secured to the inside surface of a conical separator cylinder revolving about a horizontal axis operate in conjunction with the pressure of the air and the gravity of the cream; and the object of my improvements is to extract the butter from the cream by passing atoms of air upward through said cream. I attain this object by the mechanism illustrated in the accompanying drawing in which Figure 1 is a vertical section of the entire separator showing the pneumatic process. Fig. 2 is a vertical cross section of a separator cylinder conical at both ends and having a large diameter and a short cylindrical part as in Fig. 1. Fig. 3 is a sectional view of cylinder's mouth cover and cover-clamp.

Similar figures refer to similar parts throughout the several views.

The bearings 10, 10, standards 11, 11, braces 4, 4, and base 12 constitute the framework of the separator. In bearings 10, 10, turn shafts 2, 2, carrying a separator cylinder 5, to the inner surface of which are secured several narrow spiral wings 6.

Crank pulley 1 is secured to shaft 2. Shafts 2, 2, are each secured to a flange 3, flanges 3, 3, are secured to ends of separator cylinder.

Two hook bolts 15, 15 in cover clamp 7, engage two eye bolts 9, 9, which are secured to rim 16, 16, of cylinder's mouth said mouth being at the center of the cylinder. Thumbscrew 8 holds cover 14 and gasket 13 in place over mouth of cylinder. 17 is glass gage in cover 14; the arrow indicates the direction of the air-current.

The inner surface of cover should be flush with the inner surface of cylinder as shown.

The cylinder in Fig. 1 is represented as in action but the cream is omitted to better show the interior construction. Wing 6 should commence at a point near the center of the cylinder's either end and run spirally to or nearly to the center of the cylinder. Wings running from opposite points in the cylinder should twist in opposite directions. The inner ends of the wings should be equally separated at or near the center of the cylinder. The wing 6 performs three offices: 1st without breaking the grains of butter, it gently drives or screws the cream from the cone-end of said wing for the purpose of keeping said cone-end of the wing continually above the cream and in contact with the air; 2nd, it drives or screws the cream straight down the conical part and straight along the cylindrical part for the purpose of increasing the depth of the cream in the middle of the cylinder—keeping the cream in bulk helps to keep out air-bubbles thus increasing the penetration of the aerial atoms; 3rd it draws or sucks the air in the same direction as the cream is driven for the purpose of striking the bottom surface of the cream with a current of air. If the air current should move spirally along the inner surface of the conical cylinder, the force of the air current would be turned from the cream against the concave surface of said cylinder. To perform the last two offices perfectly, the spiral wing should form an angle of about forty five degrees (45°) with any straight line drawn along the inner surface of the cylinder and across said wing.

To prevent driving the cream into an air passage formed by an opposite wing, every wing should taper to a blunt point at or near the center of the cylinder. There should be one wing for every foot of the cylinder's diameter running from the center of the cylinder's either end to or nearly to the center of the cylinder. The width of said wing should be about one-eighth ($\frac{1}{8}$) of an inch for each foot in the cylinder's diameter plus one-sixteenth ($\frac{1}{16}$) of an inch for each foot in the cylinder's length, said wing should be a fraction wider in the angle formed between the conical and cylindrical surfaces. Cylinders should be conical at both ends for the purpose of conducting air currents against the cylindrical part at an angle and for the purpose of passing the greater portion of wing 6 under the cream and keeping the cone-end or air-hole end of said wing continually above the cream and in contact with the air. The cylindrical part of the inner surface being a reflector for turning the air current upward against the bottom of the cream as shown in Fig. 1. If the speed of cylinder 5 be correct cream will rise in the middle and draw down at the ends of the cylinder as shown by dotted line 19. The cream should always draw away from the cone ends of the wing as shown in Fig. 1, for the purpose of forming a wide mouth for air-passage 21.

20 is the edge of cream at either end.

21 is an air-passage automatically formed under the cream behind wing 6.

22 is the rear edge of said air passage the front edge being the submerged portion of wing 6.

24 is an air-hole in the center of the cylinder's either end and in line with the axis of motion.

25 is a detachable screen within either conical end of the cylinder for the purpose of keeping cream out of said air hole.

26 is the counterpoise secured to the outer surface of the cylinder. Fill cylinder about one-third full of cold or iced cream, revolve cylinder by hand with crank 18 or by passing a belt around pulley 1. The wings (their cone-ends being always in contact with the air) drive the cream and draw the air toward the middle of the cylinder. When the air-current flows into air-passage 21 and comes in contact with the cream above said air current, atoms of air penetrate the cream and break the butter loose from the milk. In searching for a vacuum behind wing 6, the air freely follows said wing under and out from under the cream without rising up into said cream in the form of air-bubbles. When the cream is well granulated and the butter refuses to gather place a lighted oil-stove under the revolving cylinder—the granulated cream will be its own thermometer—as soon as the temperature is correct, the butter will gather in the middle of the cylinder. If one end of the separator be elevated about forty five degrees (45°) a stopper being inserted in the lower air-hole, the increase of the centrifugal force, and the decrease in agitation and a slow increase of the temperature will cause the cold whole grains of butter to gather in small flakes or butter crystals which may be washed salted and packed without any butter working.

I am aware that air churns are made but they fill the cream with air bubbles. Small air bubbles make cold cream frothy and large air bubbles hurry to the surface the globules of cream in which the atoms of air are at work and prevent said atoms of air from working their way up through the cream.

I claim

1. The combination in a pneumatic butter separator of a suitable frame, a crank pulley, a shaft and flange secured to either end of cylinder, a conical cylinder having air-holes in the centers of its ends and in line with the axis of motion, and detachable screens within its conical ends, and having narrow spiral wings secured to the inner surface running from said air-holes to or nearly to the center of the cylinder the inner ends of said wings being separated and having a mouth at the center of the cylinder, with gasket, cover with glass gage, and cover clamp and counterpoise substantially as set forth.

2. In a pneumatic butter separator, a cylinder conical at both ends having air holes in the vertices of the cones and in line with the axis of motion and narrow spiral wings secured to the inner surface running from said air holes to or nearly to the center of the cylinder the inner ends of said wings being separated and said wings being sufficiently spiral to draw the air straight down the conical parts and straight along the cylindrical part of said cylinder, substantially as set forth.

3. In a pneumatic butter separator a conical cylinder having air-holes in the centers of its ends and in line with the axis of motion, and narrow spiral wings secured to the inner surface running from said centers of the cylinder's ends to or nearly to the center of the cylinder the inner ends of said wings being separated and the conical parts of said cylinder being conductors of air currents and the cylindrical part of said cylinder being a reflector of air-currents substantially as set forth.

4. In a pneumatic butter separator a cylinder conical at both ends having air-holes in the centers of the cylinder's ends and in line with the axis of motion, and narrow spiral wings secured to the inner surface running from said air-holes and from said centers of the cylinder's ends and from said axis of motion to or nearly to the center of the cylinder the inner ends of said wings being separated and the conical parts of said cylinder being conductors of air currents and the cylindrical part of said cylinder being a reflector of air-currents substantially as set forth.

5. In a pneumatic butter separator the combination of a cylinder conical at both ends having an air hole in the center of the cylinder's either end and in line with the axis of motion and a narrow spiral wing or narrow spiral wings secured to the inner surface running from said air hole to or nearly to the center of the cylinder the inner ends of said wings being separated and the conical parts of said cylinder being conductors of air currents and the cylindrical part of said cylinder being a reflector of air currents substantially as set forth.

6. In a pneumatic butter separator a cylinder having a narrow wing or narrow wings secured to the inner surface of separator cylinder commencing near air hole 24 and running spirally from the center of the cylinder's either end to the cylindrical part of the inner surface then continuing spirally along the cylindrical surface and tapering to a blunt point at or near the center of the cylinder substantially as set forth.

7. A cylinder 5 having a narrow wing 6 partly secured to either end of the cylinder and partly secured to the side of the cylinder for the purpose of keeping one end of said wing continually above the cream substantially as set forth.

8. The combination of the cylinder 5 and two sets of narrow wings 6 secured to the inner surface of cylinder one set having a right hand screw action and the other set having a left hand screw action substantially as shown for the purpose specified.

9. The cylinder 5 with wing 6 secured to the inner surface of said cylinder said wing being a driver of cream currents and a drawer of air currents substantially as shown for the purpose specified.

10. In a pneumatic butter separator a cylinder having spiral wings secured to its inner surface and having conical ends for the purpose of conducting air currents against its cylindrical surface and having a cylindrical part for the purpose of reflecting air currents upward against the cream substantially as set forth.

LA FAYETTE LILLARD.

Witnesses:
 WINSLOW E. GALLISON,
 ROBERT L. PAINE.